United States Patent
Vassilieff et al.

(10) Patent No.: US 11,133,844 B2
(45) Date of Patent: Sep. 28, 2021

(54) DEVICE FOR DETECTING AN ITEM OF ELECTRONIC EQUIPMENT AND FOR COMMUNICATING WITH TWO NEAR-FIELD COMMUNICATION ANTENNAE

(71) Applicants: Continental Automotive France, Toulouse (FR); Continental Automotive GmbH, Hannover (DE)

(72) Inventors: Youri Vassilieff, Toulouse (FR); Mohamed Cheikh, Toulouse (FR); Enrique Saavedra, Toulouse (FR)

(73) Assignees: Continental Automotive France; Continental Automotive GmbH

( * ) Notice: Subject to any disclaimer, the term of this patent is extended or adjusted under 35 U.S.C. 154(b) by 0 days.

(21) Appl. No.: 17/268,667

(22) PCT Filed: Aug. 19, 2019

(86) PCT No.: PCT/EP2019/072129
§ 371 (c)(1),
(2) Date: Feb. 16, 2021

(87) PCT Pub. No.: WO2020/038881
PCT Pub. Date: Feb. 27, 2020

(65) Prior Publication Data
US 2021/0175930 A1    Jun. 10, 2021

(30) Foreign Application Priority Data

Aug. 20, 2018   (FR) ........................................ 1857542

(51) Int. Cl.
*H04B 5/00* (2006.01)
*G01V 3/10* (2006.01)

(52) U.S. Cl.
CPC ............. *H04B 5/0031* (2013.01); *G01V 3/10* (2013.01); *H04B 5/0081* (2013.01)

(58) Field of Classification Search
CPC ....... H04B 5/0031; H04B 5/0081; G01V 3/10
See application file for complete search history.

(56) References Cited

U.S. PATENT DOCUMENTS

| | | | |
|---|---|---|---|
| 2014/0125275 A1 | 5/2014 | Low et al. | |
| 2014/0320375 A1 | 10/2014 | Kessler et al. | |
| 2018/0326948 A1 | 11/2018 | Cheikh | |

FOREIGN PATENT DOCUMENTS

| | | |
|---|---|---|
| FR | 2984020 A1 | 6/2013 |
| WO | 2017076500 A1 | 5/2017 |

OTHER PUBLICATIONS

International Search Report and Written Opinion for International Application No. PCT/EP2019/072129, dated Oct. 14, 2019, 7 pages.

(Continued)

*Primary Examiner* — Robert L Deberadinis
(74) *Attorney, Agent, or Firm* — RatnerPrestia

(57) ABSTRACT

A device for detecting the approach of a portable electronic apparatus and for communicating in the near field with a first antenna for communication at high frequency and an electrical power-supply and control unit having a device for measuring a variation in the amplitude of an electrical parameter representative of detection of the approach of the apparatus. The device includes a second near-field communication antenna housed in a space delimited by the first antenna and associated with a resonance circuit by being connected to the control unit by a switch having a first position for near-field communication where the second antenna is not supplied with power and a second position for approach detection where the second antenna is connected and enters into resonance with the first, active antenna.

11 Claims, 3 Drawing Sheets

(56) References Cited

OTHER PUBLICATIONS

International Search Report and Written Opinion for International Application No. PCT/EP2019/072129, dated Oct. 14, 2019, 11 pages (French).
English Translation of the Written Opinion for International Application No. PCT/EP2019/072129, dated Oct. 14, 2019, 6 pages.

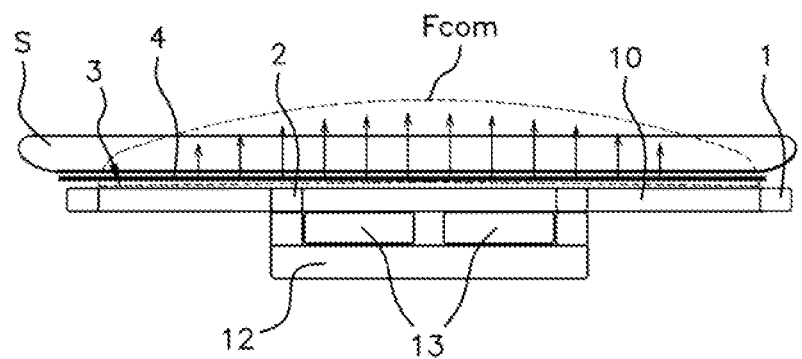
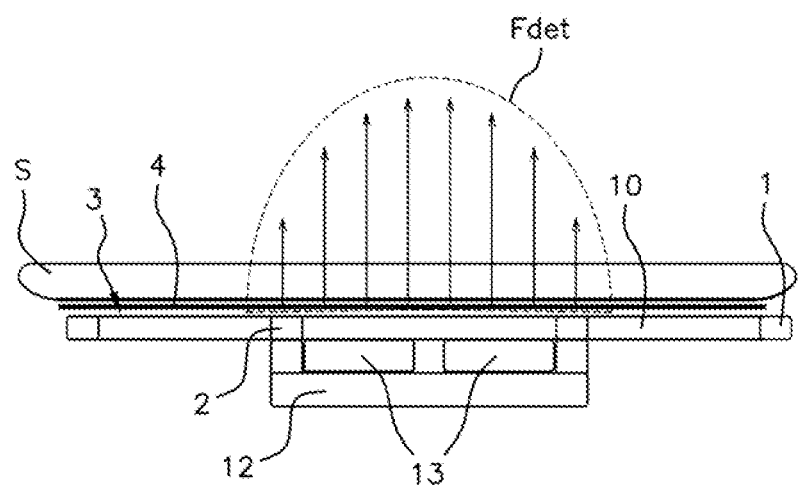
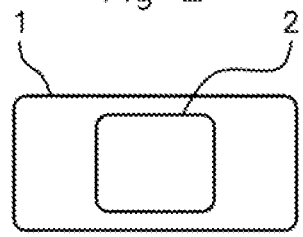

DEVICE FOR DETECTING AN ITEM OF ELECTRONIC EQUIPMENT AND FOR COMMUNICATING WITH TWO NEAR-FIELD COMMUNICATION ANTENNAE

CROSS REFERENCE TO RELATED APPLICATIONS

This application is the U.S. National Phase Application of PCT International Application No. PCT/EP2019/072129, filed Aug. 19, 2019, which claims priority to French Patent Application No. 1857542, filed Aug. 20, 2018, the contents of such applications being incorporated by reference herein.

FIELD OF THE INVENTION

The present invention relates to a device for detecting the approach of an electronic apparatus and for communicating with two near-field communication antennas, one of the two near-field communication antennas being connected differently during detection or during communication.

In one preferred non-limiting application, the invention applies to devices for inductively charging portable electronic apparatuses, intended to be installed on board a motor vehicle and comprising a near-field communication device in order to communicate with a portable apparatus once said apparatus has been placed on a support element of the device.

In such a device for detection and communication in the near field, a first near-field communication antenna emits a magnetic field at a high frequency selected from between 3 to 30 MHz. The first communication antenna is arranged beneath a support element capable of receiving the portable electronic apparatus. The first antenna is also capable of communicating in the near field with the apparatus.

The device includes an electrical power-supply and control unit. The control unit and the first near-field communication antenna are electrically connected to one another by a first power-supply line comprising at least one discrete passive matching component.

The control unit has means for measuring a variation in the amplitude of an electrical parameter at the first communication antenna representative of detection of the approach of a portable electronic apparatus.

BACKGROUND OF THE INVENTION

In the non-limiting case of a motor vehicle, it is known practice to place a portable electronic apparatus on a support element of an approach detection and communication device so that the electronic apparatus can communicate at the same time as or after the charging period by near-field communication, or NFC, with the onboard electronic system of the vehicle, this communication taking place at a high frequency selected from between 3 to 30 MHz and preferably of the order of 13.56 MHz.

This short-distance wireless communication (generally about a few millimeters) makes it possible, among other things, for the vehicle to download a particular user profile contained in the portable apparatus and thus to adjust elements of the vehicle according to this profile, for example to adjust the position of the driver seat in the vehicle, to program favorite radio stations, to modify the appearance of the instrument panel or to activate the "E-call" (emergency-call) function, etc.

Such a detection and communication device can be coupled with a device for charging the portable electronic apparatus. Such a charging device comprises a dedicated radiofrequency antenna for inductive charging, referred to as the charging antenna, which is a WPC (Wireless Power Consortium) antenna, i.e. a wireless inductive-charging antenna in accordance with the standards of this consortium, allowing inductive charging at frequencies ranging from 100 to 200 kHz.

It is known practice to detect the approach of a portable apparatus by sending a succession of simple analog signals, simple because no frames are generated by the charging device and emitted by the WPC charging antenna. Each analog signal consists of a current or voltage pulse that is emitted periodically, for example every 100 ms, and for a very short duration, for example 30 µs, so as to save energy. These analog signals are interrogation signals which generate an electromagnetic field in proximity to what is referred to as the "primary" charging antenna.

It is also possible to detect the approach of a portable apparatus by sending simple analog signals of the same type as the preceding ones but at high frequency generated by the control unit and emitted by the near-field communication antenna, this being done by a device for approach detection and NFC communication at high frequency which may or may not be associated with a charging device.

Thus, such approach-detection methods used today make it possible to detect the presence of a parasitic metal portable electronic apparatus in the charging region or the addition of a portable electronic apparatus to the NFC communication device which may or may not be associated with an induction-charging device.

The interrogation procedure may take place as follows. The device sends repeating interrogation signals at low frequency for a charging device or at high frequency for a near-field communication device. The control unit of the device measures the variation in amplitude at the emitting antenna, that is to say a decrease in the reactive power due to an impedance mismatch at the emitting antenna.

The portable electronic apparatus, for example a mobile phone or a tablet, changes the electrical parameters of the near-field communication antenna as well as the impedance seen by the generator of the control unit of the device. A phase variation due to a phase change linked to an impedance mismatch at the near-field communication antenna is therefore detected.

Once the portable electronic apparatus has been detected, the control unit of the device sends one or two digital signals in order to identify the nature of the portable electronic apparatus and its compatibility with the near-field communication device and, where applicable, the charging device.

If the high-frequency near-field response, or NFC response, to the digital identification signal in near-field communication emitted by the apparatus is positive, this apparatus is compatible with the NFC communication device.

Where applicable, if the response, referred to as the WPC response, to the digital charging-identification signal emitted by the apparatus is positive, this apparatus is compatible with the induction-charging device.

In the absence of response from the portable electronic apparatus, this apparatus is considered to be a parasitic metal element.

However, such approach-detection methods have very many disadvantages. It is not always possible to obtain reliable detection that is compatible with certain portable electronic apparatuses. Indeed, many portable electronic apparatuses present detection problems.

Detection sensitivity with respect to the communication device is low. In addition, the implementation of the methods requires increased power consumption in the detection region for relatively low electromagnetic compatibility. In addition, the radiated level of radiofrequency emissions during the detection phase as well as the exposure of the human body to electromagnetic waves are high.

SUMMARY OF THE INVENTION

The problem underlying an aspect of the present invention is, for a near-field communication device intended to receive a portable electronic apparatus on a support element so that this apparatus is in near-field communication with the device and, where applicable, can be charged by induction by the device then comprising a charging device, that of increasing the sensitivity of the device during detection of the approach of the portable electronic element.

To that end, an aspect of the present invention relates to a device for detecting the approach of a portable electronic apparatus and for communicating with said apparatus in the near field, the device comprising, on the one hand, a first near-field communication antenna emitting a magnetic field at a high frequency selected from between 3 to 30 MHz, the first communication antenna being arranged beneath a support element capable of receiving the portable electronic apparatus and the first antenna being capable of communicating in the near field with the apparatus and, on the other hand, an electrical power-supply and control unit, the control unit and the first near-field communication antenna being electrically connected to one another by a first power-supply line comprising at least one discrete passive matching component, the control unit having means for measuring a variation in the amplitude of an electrical parameter at the first communication antenna representative of detection of the approach of a portable electronic apparatus, noteworthy in that it further comprises:

a second near-field communication antenna housed at the first communication antenna in a space delimited by the first communication antenna and being associated with resonance means that are incorporated within a resonance circuit by being connected to the control unit by a second control and/or command line comprising a switch having two positions with, in a first, "open" position, the second communication antenna being inactive via the opening of the resonance circuit and, in a second position, the second communication antenna being supplied with power via magnetic coupling by the first antenna and the resonance circuit being closed by the switch of the second control and/or command line, the second communication antenna entering into self-resonance with itself and into resonant coupling with the active first communication antenna, and means for controlling the switch integrated within the control unit, the switch being in the second position for detecting the approach of a portable electronic apparatus and in the first position for near-field communication.

For an aspect of the present invention, the implementation of the detection in itself remains unchanged and consists in measuring the voltage or the current intensity at the first near-field communication antenna. An aspect of the present invention sets up a second near-field communication antenna associated with a resonance circuit which makes it possible to change the near-field coverage in order to adjust detection sensitivity in detection mode while not decreasing communication stability in communication mode.

The resonance of the second antenna, advantageously in the form of a magnetic coil, makes it possible to cover a detection region that is more limited than in detection by the first antenna alone. This second antenna is associated with a resonance circuit which is directly connected thereto. A switch controlled by a microcontroller in the control unit makes it possible to close or open the resonance circuit in order to activate or not to activate the second antenna in resonance, this being done by magnetic coupling with the first antenna, in the first case, during detection and, in the second case, during near-field communication.

It follows that the magnetic radiation emitted by the device changes shape depending on the activation or deactivation of the second near-field antenna which is then in resonance or not in resonance, respectively.

The radiation emitted by the first antenna with the second antenna inactive and its resonance circuit open entirely covers the placement surface that is the support element for the apparatus with a homogeneous and less intense magnetic distribution. This is favorable for a communication mode.

The magnetic radiation emitted by the first antenna with the second antenna in self-resonance and its resonance circuit closed, the second antenna being supplied with power via magnetic coupling by the first antenna, covers a smaller area, advantageously in a mid region of the device, which may be a region dedicated to charging the apparatus once it is borne by the device, with a magnetic distribution concentrated in this more intense mid region.

The technical effect obtained is that of substantially increasing the sensitivity of the device in detection mode while maintaining good communication once the apparatus has been detected.

Placing a second communication antenna in self-resonance and associating it with the first antenna increases the power received by the device in return from the portable apparatus when this apparatus is close to the device with a narrow magnetic-field beam that extends above a mid portion of the detection device. In communication mode, it returns to the use of a single communication antenna producing a magnetic-field beam that covers the entire surface of the device.

It is thus possible to decrease radiated emissions and the risks associated with exposure to the human body, to decrease false detections and to limit the detection of a metal portable electronic apparatus within a mid region of the device, which may correspond to an induction-charging region when the device also provides charging of the portable apparatus, which is done in order to ensure good communication stability.

Advantageously, the first and second communication antennas are borne by a planar member, the first communication antenna running inside a peripheral region of the planar member. Bearing may also mean that the communication antennas are integrated into the planar member or supported externally by this planar member.

Advantageously, the support element, the first communication antenna and the second communication antenna as well as the planar member are of rectangular shape, the second communication antenna being arranged symmetrically with respect to the first communication antenna while being surrounded by the first antenna.

It follows that the first antenna covers the entire area of the device covered by the support element of the apparatus while the second antenna covers a mid region of the device with a magnetic field concentrated in this region. The first and second communication antennas may advantageously be in the form of coils.

Advantageously, the device comprises at least one emitting induction-charging antenna arranged beneath the planar member and emitting a magnetic field at a low frequency selected from between 30 to 300 kHz, a layer made of ferromagnetic material being arranged below said at least one charging antenna, said at least one charging antenna being arranged below an internal space delimited by the second communication antenna.

It is conventional practice to combine an induction-charging device with a device for detection and communication in the near field. The problem is that induction charging requires good positioning of the apparatus with respect to the one or more charging antennas. This is obtained by the placing in resonance of the second antenna for communication at high frequency when implementing a detection mode of the device. Since the second antenna covers the optimal space for positioning the apparatus for charging, adequate positioning of the apparatus for charging can be detected.

Advantageously, the device comprises a first printed circuit board housing the electrical power-supply and control unit, the first printed circuit board being located with respect to said at least one charging antenna opposite the first and second communication antennas and a second, intermediate printed circuit board located below the support element and bearing the first and second communication antennas, the second, intermediate board forming the planar member. The first and second antennas may be etched on or in the second, intermediate board.

Advantageously, the means for controlling the switch are integrated within the control unit, the switch being in the form of a transistor.

Advantageously, the resonance means that are incorporated within the resonance circuit comprise a capacitor connected in series with the second communication antenna in the resonance circuit.

Advantageously, said at least one discrete passive matching component in the first power-supply line is in the form of a first capacitor and a resistor that are connected in series in the first power-supply line, the first power-supply line comprising a diversion branch between the resistor and the first capacitor, the diversion branch comprising a second capacitor and being connected to earth.

An aspect of the invention also relates to a method for detecting a portable electronic apparatus and for communicating with said apparatus in the near field by means of such a device, analog repeating signals being sent by the first communication antenna for detection of a portable electronic apparatus located in proximity to the support element and a variation in the amplitude of an electrical parameter at the first communication antenna being monitored, this amplitude variation being representative of detection of the approach of a portable electronic apparatus, noteworthy in that, during the detection by sending analog repeating signals, the second communication antenna is placed in self-resonance by the resonance circuit and in resonant coupling with the first antenna so that the magnetic field is concentrated above a mid region of the device and, when the presence of the apparatus on the support element is detected via variation in the amplitude of the electrical parameter, the second communication antenna is inactive and its resonance circuit open and a digital signal comprising a near-field communication compatibility query frame is sent to the portable electronic apparatus to which digital signal the portable electronic apparatus responds when this apparatus is compatible, the rest of the near-field communication between the portable electronic apparatus continuing with the second communication antenna inactive and its resonance circuit open, and, when no response from the portable electronic apparatus is received by the device, the apparatus is considered to be a parasitic metal element.

The method according to an aspect of the present invention allows two operating modes to be implemented. The first mode is a mode for detecting a portable electronic apparatus. In this detection mode, with concentration of the magnetic field above the mid region of the device with activation of the first antenna and of the second antenna placed in self-resonance and in resonant coupling with the first antenna, substantial detection sensitivity is obtained so as to obtain reliable and rapid detection in this mid region. In this detection mode, the frequency band becomes very narrow, which is an important quality factor in order to have a resonance frequency that is very sensitive to the state of the magnetic environment.

The second mode is a communication mode allowing homogeneous and stable magnetic coverage over the entire placement surface formed by the support element for the apparatus. The frequency band becomes broad in order to accept a high communication throughput and ensure resonance stability during the exchange in near-field communication.

The detection and communication modes which require their own specific magnetic-field emissions are thus optimized. For detection, what is required is a magnetic field emitted by the device that is concentrated in the mid region of the device with a narrow bandwidth at high frequencies while, for communication, what is required is a magnetic field distributed over the entire surface of the device in order to obtain communication stability, provided by a broad bandwidth at high frequencies.

This allows communication with any type of compatible portable apparatus, once this apparatus has been positioned correctly on the device. An aspect of the present invention, by virtue of implementing resonance of the second antenna in detection mode and disconnecting this second antenna in communication mode, makes it possible to obtain an emitted magnetic field that is optimal for each mode.

Advantageously, when the device comprises at least one induction-charging antenna emitting a magnetic field at a low frequency selected from between 30 to 300 kHz, after detection of the presence of the portable electronic apparatus by the device, said at least one charging antenna sends a digital signal comprising a low-frequency charging compatibility query frame to the portable electronic apparatus, induction charging starting after receiving a response that the portable electronic apparatus is indeed compatible for charging.

An aspect of the invention also relates to a motor vehicle, noteworthy in that it comprises such a device for detecting the approach of a portable electronic apparatus and for communicating with the apparatus in the near field.

BRIEF DESCRIPTION OF THE DRAWINGS

Other features, aims and advantages of an aspect of the present invention will become apparent on reading the detailed description that follows and on examining the appended drawings given by way of non-limiting examples, and in which:

FIGS. 1A and 1B schematically show a sectional view of a device for detection and communication in the near field according to an aspect of the present invention working respectively in near-field communication mode following a mode of detecting the approach of a portable electronic apparatus and in detection mode, the device comprising a first communication antenna and a second communication antenna placed in resonance when detecting the approach of the apparatus, the device having antennas for charging the portable electronic apparatus by induction in this embodiment, FIG. 2 schematically shows a top view of two first and second communication antennas forming part of a device according to an aspect of the present invention, the first antenna surrounding the second antenna.

DETAILED DESCRIPTION OF THE PREFERRED EMBODIMENTS

Figure 3:
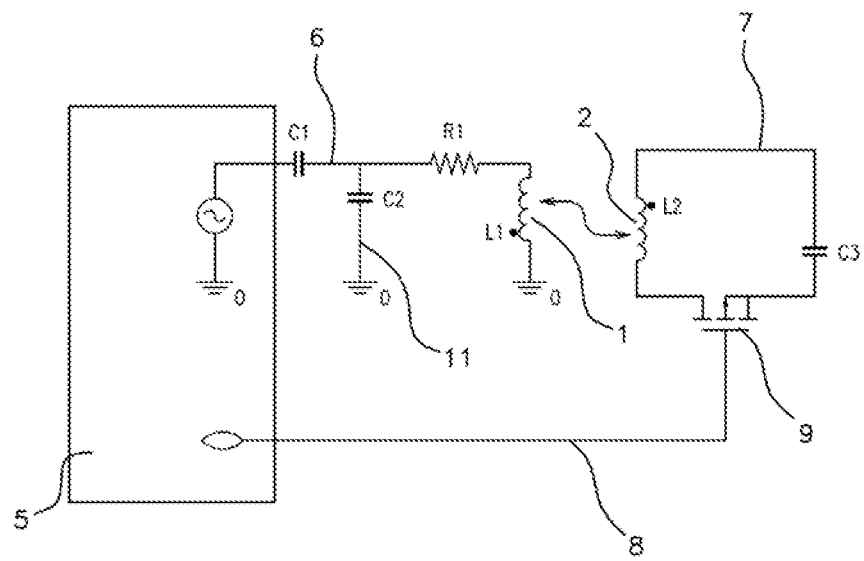
FIG. 3 shows a circuit diagram of the device according to an aspect of the present invention with a power-supply and control unit connected to the first and second communication antennas, a switch opening or closing a resonance circuit associated with the second communication antenna.

In what follows, "above" and "below" are to be interpreted fora communication device 3 on which the portable electrical apparatus S is placed, which is the most common configuration for a communication device 3 and a portable electrical apparatus S together. Another configuration is however possible.

Reference will be made to all of the figures for the identification of the designated reference numerals.

Referring to all of the figures and more particularly to FIGS. 1A, 1B, 2 and 3, an aspect of the present invention relates to a device 3 for detecting the approach of a portable electronic apparatus S and for communicating with the apparatus S in the near field.

The device 3 comprises a first near-field communication antenna 1 emitting a magnetic field at a high frequency selected from between 3 to 30 MHz. The first communication antenna 1 is arranged beneath a support element 4 capable of receiving the portable electronic apparatus S and the first antenna is capable of communicating in the near field with the apparatus S.

The device 3 also comprises an electrical power-supply and control unit 5, visible in FIG. 3. The control unit 5 and the first near-field communication antenna 1 are electrically connected to one another by a first power-supply line 6 comprising at least one discrete passive matching component C1, R1. The control unit 5 has means for measuring a variation in the amplitude of an electrical parameter at the first communication antenna 1 representative of detection of the approach of a portable electronic apparatus S, these means not being visible in the figures.

When a compatible portable apparatus is placed in proximity to the device for approach detection and communication in the near field, this apparatus modifies the electromagnetic field generated during the emission of the analog signal, referred to as the interrogation signal, thus creating a coupling by interaction or interference between, on the one hand, the first near-field communication antenna 1 of the device and, on the other hand, a suitable antenna of the portable apparatus. This coupling by interaction or interference, which modifies the intensity of the current flowing through the antenna of the device, is detected by the control unit of the device which thus deduces therefrom that a compatible apparatus is in proximity to the detection and communication device.

According to an aspect of the invention, the device 3 for detecting the approach of a portable electronic apparatus S and communicating in the near field comprises a second near-field communication antenna 2 housed at the first communication antenna 1 in a space delimited by the first communication antenna 1. As can be seen in FIGS. 1A and 1B, the first and second communication antennas 1, 2 are in one and the same plane, the first antenna at least partially encircling the second antenna. This is also visible in FIG. 2.

Referring more particularly to FIG. 3, the second antenna is associated with resonance means C3 that are incorporated within a resonance circuit 7 by being connected to the control unit 5 by a second control and/or command line 8. The second line 8 comprises, at its junction with the resonance circuit 7, a switch 9 that has two positions.

In a first position, referred to as the open position, of the switch 9, the second communication antenna 2 is not placed in self-resonance and its resonance circuit is opened by the switch 9 controlled by the second control and/or command line 8. In a second position, referred to as the closed position, of the switch 9, the second communication antenna 2 is active by being supplied with power via magnetic coupling by the first communication antenna 1 and the resonance circuit 7 is closed by the switch 9 controlled by the second control and/or command line 8, the second communication antenna 2 entering into self-resonance with itself and into resonant coupling with the active first communication antenna 1.

The device 3 comprises means for controlling the switch 9 which are integrated within the control unit 5. The switch 9 is in the second position for detecting the approach of a portable electronic apparatus S and in the first position for near-field communication.

Figure 5A:
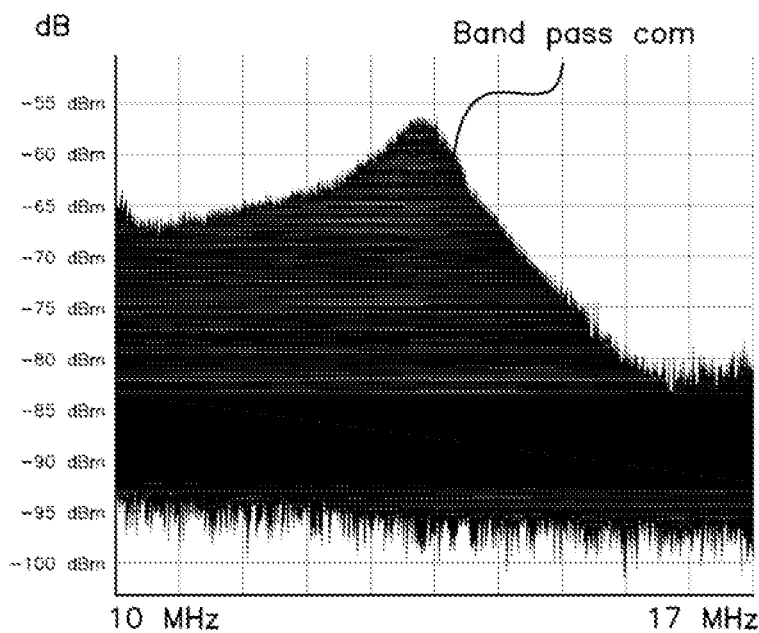
FIGS. 5A and 5B show, respectively, a power spectrum of the power received in return by a device according to an aspect of the invention respectively in a near-field communication mode for which the bandwidth is broad and the spectral density is of low power, and in a detection mode for which the bandwidth is narrow and the spectral density is of high power, the sensitivity for detecting a portable apparatus then being enhanced.

The first communication antenna 1, which is the outermost with respect to the device 3, is always supplied with power and is used mainly for near-field communication with, in this case, the second communication antenna 2, which is the innermost with respect to the device 3, and is then disconnected because its resonance circuit 7 is open. This makes it possible to obtain a broad magnetic-field distribution covering the entire device with a power spectral-density distribution over a range of high frequencies as shown in FIG. 5A.

A spectrum is narrow in a detection phase and a spectrum is broad in a communication phase with a quantity of energy emitted remaining the same but its frequency distribution being different between the two phases.

Figure 5B:
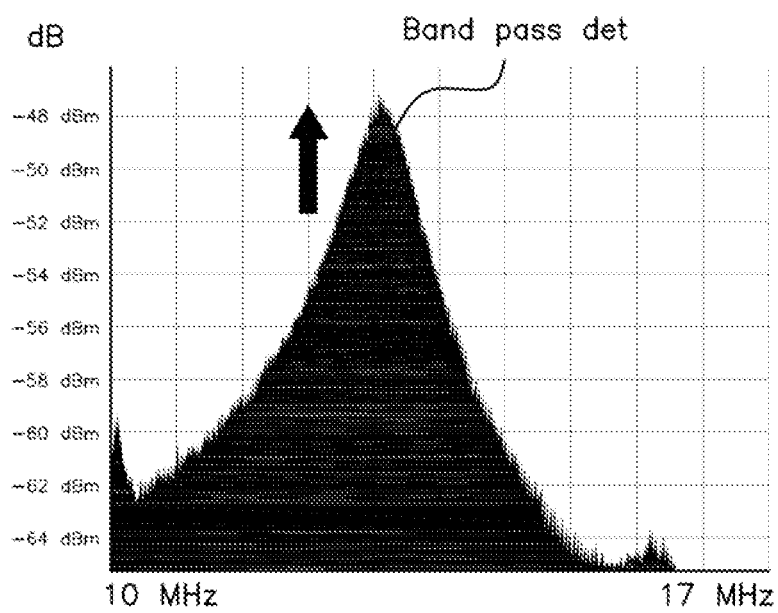

In a detection mode, the second antenna 2 is active by being supplied with power via magnetic coupling by the first communication antenna 1 and placed in resonance by its resonance circuit 7 while the first communication antenna 1 is being supplied with power. This makes it possible to obtain the different and more restricted magnetic-field distribution, with a power spectral-density distribution over a range of high frequencies as shown in FIG. 5B.

Figure 4:
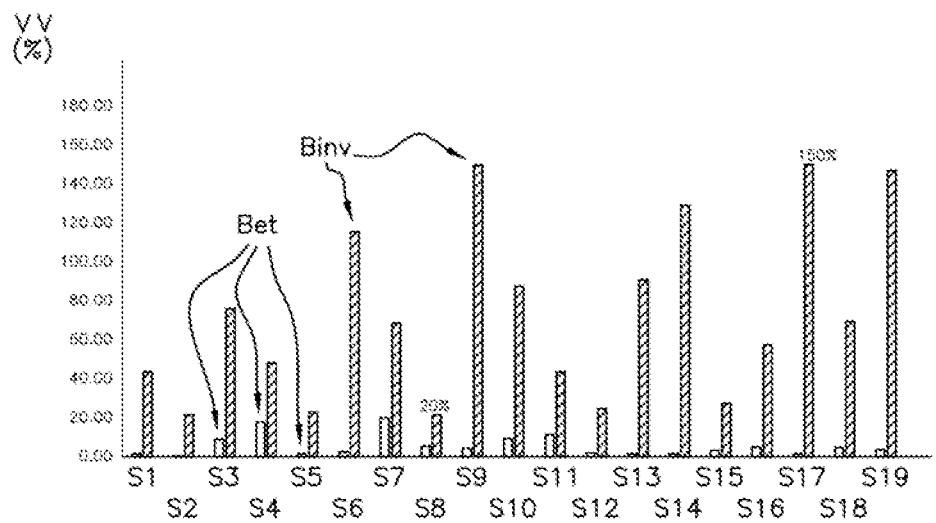
FIG. 4 shows a bar graph illustrating the voltage variation expressed as a percentage for various portable electronic apparatuses, this variation being obtained by emission of a high-frequency signal respectively for a device according to the prior art and a device according to an aspect of the present invention.

FIG. 4 shows a variation in voltage VV expressed as a percentage for different comparable portable electronic apparatuses 51 to 519, for example different mobile telephones, but this is not limiting since an aspect of the present invention may be applied to the detection of the approach of portable electronic apparatuses other than telephones, for example tablets, electronic fobs or laptop computers.

Depending on the portable electronic apparatus 51 to 519 taken individually, there is a large variation in voltage during the detection of their approach, the voltage variations VV oscillating according to the apparatus 51 to 519. For each portable electronic apparatus 51 to 519, two bars are shown, the left-hand bar Bet being the voltage variation obtained according to a method of the prior art and the right-hand bar Binv being the voltage variation obtained according to a method according to an aspect of the present invention. For the sake of clarity, in FIG. 4, just one right-hand bar bears the reference Binv while just one left-hand bar bears the reference Bet for all of the portable electronic apparatuses 51 to 519.

It can be seen, for a given portable electronic apparatus 51 to 519, that the voltage variation is greater during the implementation of the method according to an aspect of the invention, varying from 20 to 150%, than for a method according to the prior art, for which a voltage variation of no more than 20% is obtained. It follows that detection sensitivity has been considerably improved for a detection method according to an aspect of the invention with respect to a detection method according to the prior art.

FIGS. 5A and 5B show the power spectral density in dBm which is the abbreviation for the power level in decibels (dB) of the measured power with respect to one milliwatt (mW) returned in communication and in detection of the approach of the portable electronic apparatus, respectively, the method according to an aspect of the invention being implemented in the approach detection with the second near-field communication antenna placed in self-resonance, this being done for a high-frequency range varying from 10 MHz to 17 MHz.

The bandwidth in communication Band pass com is broader than the bandwidth in approach detection Band pass det but the power spectral density is higher in detection mode, the vertical arrow pointing upward symbolizing a gain in power spectral density going from −55 dBm in communication mode to −48 dBm in detection mode, the unit dBm being an abbreviation of the power level in decibels (dB) of the measured power with respect to one milliwatt (mW).

FIGS. 1A and 1B illustrate the shape of a magnetic-field beam in communication mode Fcom and in detection mode Fdet, respectively. The magnetic-field beam in communication mode Fcom is broader and flatter than the magnetic-field beam in detection mode Fdet.

The magnetic-field beam in detection mode Fdet is limited by being only present in a mid region of the device 3 and absent at the periphery of the device 3 while the magnetic-field beam in communication mode Fcom covers the entire device 3. The shape of the magnetic-field beam in communication mode Fcom allows greater coverage of the device 3 than for the magnetic-field beam in detection mode Fdet and is therefore suitable for near-field communication.

This results in a power spectral density in communication and detection mode according to the curves of FIGS. 5A and 5B, respectively. A higher level of detection sensitivity is obtained with the implementation of the second communication antenna 2 surrounded by the first antenna 1 during detection mode than during communication mode.

As can be seen in FIGS. 1A and 1B, the first and second communication antennas 1, 2 are borne by a planar member 10, the first communication antenna 1 running inside a peripheral region of the planar member 10, therefore in proximity to the edges of the planar member 10 so as to cover the entire surface of the device 3 covered by the support element 4 bearing the apparatus S.

As can be seen in FIGS. 1A and 1B and 2, for the first and second communication antennas 1, 2, the support element 4, the first communication antenna 1 and the second communication antenna 2 and the planar member 10 may be rectangular in shape. The second communication antenna 2 may be arranged symmetrically with respect to the first communication antenna 1 while being surrounded by the first antenna 1, that is to say in the mid region of the rectangle traced by the first communication antenna 1. This is not limiting and other shapes are also possible such as circular, oval or more complex shapes.

Conventionally, a near-field communication device 3 may be associated with a device for induction-charging the portable electrical apparatus S, which is then arranged against the support element 4 for supporting the apparatus S which forms part of the device 3.

To do this, with reference to FIGS. 1A and 1B, the device 3 may comprise at least one emitting induction-charging antenna 13 arranged beneath the planar member 10 and emitting a magnetic field at a low frequency selected from between 30 to 300 kHz. In FIGS. 1A and 1B, two induction-charging antennas 13 are shown in the form of a respective coil resting on a layer 12 made of ferromagnetic material, advantageously of ferrite.

However, it may have more than two charging antennas 13, for example three, a third charging antenna being able to be arranged by at least partially covering two charging antennas 13, the third charging antenna being able to be arranged symmetrically with respect to these two antennas.

As previously mentioned, for one or more charging antennas 13, a layer 12 of ferromagnetic material, advantageously ferrite, may be arranged below the one or more charging antennas 13. These one or more charging antennas 13 may be arranged below an internal space delimited by the second communication antenna 2.

The device 3 may comprise a first printed circuit board housing the electrical power-supply and control unit 5, this first printed circuit board not being illustrated in FIGS. 1A and 1B. The first printed circuit board may be located with respect to the one or more charging antennas 13 opposite the first and second communication antennas 1, 2.

A second, intermediate printed circuit board may be located below the support element 4 and bear the first and second communication antennas 1, 2, the second, intermediate board forming the previously mentioned planar member 10.

With particular reference to FIG. 3, the means for controlling the switch 9 may be integrated within the control unit 5, the switch 9 being in the form of a transistor.

This FIG. 3 shows the first and second communication antennas 1, 2 comprising or in the form of a respective coil L1 and L2. The second communication antenna 2 is associated with a resonance circuit 7 comprising resonance means C3 that are incorporated within the resonance circuit 7 comprising a capacitor C3 connected in series with the second communication antenna 2, L2 in the resonance circuit 7.

The one or more discrete passive matching components present in the first power-supply line 6 may be in the form of a first capacitor C1 and a resistor R1 that are connected in series in the first power-supply line 6. The first power-supply line 6 may connect the power-supply and control unit 5 and the first communication antenna 1.

This first line 6 may also comprise a diversion branch 11 inserted between the resistor R1 and the first capacitor C1, the diversion branch 11 comprising a second capacitor C2 and being connected to earth. The second control and/or command line 8 connects the power-supply and control unit 5 to the resonance circuit 7.

An aspect of the invention also relates to a method for detecting a portable electronic apparatus S and for communicating with the apparatus S in the near field by means of a device 3 for detection and communication in the near field as described above.

Analog repeating signals are sent by the first communication antenna 1 for detecting a portable electronic apparatus S located in proximity to the support element 4. A variation in the amplitude of an electrical parameter at the first communication antenna 1 is monitored, this amplitude variation being representative of detection of the approach of a portable electronic apparatus S.

According to an aspect of the present invention, during the detection by sending analog repeating signals, the second communication antenna 2 is supplied with power via magnetic coupling with the first antenna 1 and placed in self-resonance with itself and consequently in resonant coupling with the first antenna 1 so that the magnetic field is concentrated above a mid region of the device 3.

When the presence of the apparatus S on the support element 4 is detected via variation in the amplitude of the electrical parameter, the second communication antenna 2 is inactive and its resonance circuit 7 opened by the switch 9 and a digital signal comprising a near-field communication compatibility query frame is sent to the portable electronic apparatus S to which digital signal the portable electronic apparatus S responds when this apparatus S is compatible.

The rest of the near-field communication between the portable electronic apparatus S then continues with the second communication antenna 2 inactive and its resonance circuit 7 open. In the event that no response from the portable electronic apparatus S is received by the device 3, the apparatus S is considered to be a parasitic metal element.

The method according to an aspect of the invention therefore provides a detection mode and a communication mode, the detection mode being the default mode. Specifically, the implementation of the detection mode by default makes it possible to detect whether a portable electronic apparatus S is already positioned on the support element 4 of the near-field communication device 3, the monitored electrical parameter having an amplitude that does not vary and is at the level of an amplitude representative of an apparatus S already in position.

If this is the case, the detection mode is replaced with the communication mode. If this is not the case, the detection mode continues until the approach of a portable electronic apparatus S is detected. Selecting a communication mode as the default mode would not be optimal for detection and would have the same drawbacks as a method of the prior art.

As mentioned previously, the device 3 may comprise at least one induction-charging antenna 13 emitting a magnetic field at a low frequency selected from between 30 to 300 kHz, the device then also performing the function of induction charger.

In this case, after detection of the presence of the portable electronic apparatus S by the device 3, the one or more charging antennas 13 may send a digital signal comprising a low-frequency charging compatibility query frame, also called a WPC signal, to the portable electronic apparatus S, induction charging starting after receiving a response that the portable electronic apparatus S is indeed compatible for charging with the device 3.

An aspect of the present invention is particularly advantageously applicable, although with no limitation, to devices 3 for detection and communication in the near field installed in motor vehicles which also provide, where applicable, induction charging of a portable apparatus S applied against the detection and communication device 3.

An aspect of the present invention therefore also relates to a motor vehicle including such a device 3 for detecting the approach of a portable electronic apparatus S and for communicating with the portable electronic apparatus S in the near field.

Nowadays, certain motor vehicles are provided with a charging device allowing the charging of a battery of a portable electronic user apparatus such as, for example, a mobile telephone, by induction.

The communication device frequently uses a near-field communication mode that allows communication with one or more electronic apparatuses.

The near-field communication protocol allows the exchange of frames between apparatuses up to a distance of about 10 centimeters and at high frequency. This near-field communication technology is used in many sectors. In particular, it is known practice to provide a near-field communication region in proximity to a dashboard of a motor vehicle.

The driver may bring a near-field communication apparatus such as a smartphone, a tablet, an electronic fob or any other apparatus equipped with a near-field communication module close to this region so as to establish near-field communication between the apparatus and a computer of the motor vehicle. This communication may be used for example to authorize the starting of the motor vehicle via a secure mobile telephone, to perform pairing between the near-field communication apparatus and the computer of the motor vehicle, this pairing allowing a Bluetooth connection to be established in the passenger compartment, or for any other purpose.

The invention claimed is:

1. A device for detecting an approach of a portable electronic apparatus and for communicating with said apparatus in a near field, the device comprising, on the one hand, a first near-field communication antenna emitting a magnetic field at a high frequency selected from between 3 to 30 MHz, the first communication antenna being arranged beneath a support element capable of receiving the portable electronic apparatus, the first antenna being capable of communicating in the near field with the apparatus and, on the other hand, an electrical power-supply and control unit, the control unit and the first near-field communication antenna being electrically connected to one another by a first power-supply line comprising at least one discrete passive matching component, the control unit having means for measuring a variation in the amplitude of an electrical parameter at the first communication antenna representative of detection of the approach of a portable electronic apparatus, and further comprising:

a second near-field communication antenna housed at the first communication antenna in a space delimited by the first communication antenna and being associated with resonance means that are incorporated within a resonance circuit by being connected to the control unit by a second control and/or command line comprising a switch having two positions with, in a first, "open" position, the second communication antenna being inactive via the opening of the resonance circuit and, in a second position, the second communication antenna being supplied with power via magnetic coupling by the first antenna and the resonance circuit being closed by the switch of the second control and/or command line, the second communication antenna entering into self-resonance with itself and into resonant coupling with the active first communication antenna, and means for controlling the switch integrated within the control unit, the switch being in the second position for detecting the approach of a portable electronic apparatus and in the first position for near-field communication.

2. The device as claimed in claim 1, wherein the first and second communication antennas are borne by a planar member, the first communication antenna running inside a peripheral region of the planar member.

3. The device as claimed in claim 2, wherein the support element, the first communication antenna and the second communication antenna as well as the planar member are of rectangular shape, the second communication antenna being arranged symmetrically with respect to the first communication antenna while being surrounded by the first antenna.

4. The device as claimed in claim 3, wherein the device further comprises at least one emitting induction-charging antenna arranged beneath the planar member and emitting a magnetic field at a low frequency selected from between 30 to 300 kHz, a layer made of ferromagnetic material being arranged below said at least one charging antenna, said at least one charging antenna being arranged below an internal space delimited by the second communication antenna.

5. The device as claimed in claim 4, wherein the device further comprises a first printed circuit board housing the electrical power-supply and control unit, the first printed circuit board being located with respect to said at least one charging antenna opposite the first and second communication antennas and a second, intermediate printed circuit board located below the support element and bearing the first and second communication antennas, the second, intermediate board forming the planar member.

6. The device as claimed in claim 1, wherein the means for controlling the switch are integrated within the control unit, the switch being in the form of a transistor.

7. The device as claimed in any claim 1, wherein the resonance means that are incorporated within the resonance circuit comprise a capacitor connected in series with the second communication antenna in the resonance circuit.

8. The device as claimed in claim 1, wherein said at least one discrete passive matching component in the first power-supply line is in the form of a first capacitor and a resistor that are connected in series in the first power-supply line, the first power-supply line comprising a diversion branch between the resistor and the first capacitor, the diversion branch comprising a second capacitor and being connected to earth.

9. A method for detecting a portable electronic apparatus and for communicating with said apparatus in a near field by means of a device as claimed in claim 1, analog repeating signals being sent by the first communication antenna for detection of a portable electronic apparatus located in proximity to the support element and a variation in the amplitude of an electrical parameter at the first communication antenna being monitored, this amplitude variation being representative of detection of the approach of a portable electronic apparatus, wherein, during the detection by sending analog repeating signals, the second communication antenna is placed in self-resonance by the resonance circuit and in resonant coupling with the first antenna so that the magnetic field is concentrated above a mid region of the device and, when the presence of the apparatus on the support element is detected via variation in the amplitude of the electrical parameter, the second communication antenna is inactive and its resonance circuit open and a digital signal comprising a near-field communication compatibility query frame is sent to the portable electronic apparatus to which digital signal the portable electronic apparatus responds when this apparatus is compatible, the rest of the near-field communication between the portable electronic apparatus continuing with the second communication antenna inactive and its resonance circuit open, and, when no response from the portable electronic apparatus is received by the device, the apparatus is considered to be a parasitic metal element.

10. The method as claimed in claim 9, wherein, when the device comprises at least one induction-charging antenna emitting a magnetic field at a low frequency selected from between 30 to 300 kHz, after detection of the presence of the portable electronic apparatus by the device, said at least one charging antenna sends a digital signal comprising a low-frequency charging compatibility query frame to the portable electronic apparatus, induction charging starting after receiving a response that the portable electronic apparatus is indeed compatible for charging.

11. A motor vehicle, comprising a device for detecting the approach of a portable electronic apparatus and for communicating with the apparatus in the near field as claimed in claim 1.

* * * * *